(12) United States Patent
Fujishiro et al.

(10) Patent No.: US 10,004,104 B2
(45) Date of Patent: *Jun. 19, 2018

(54) MOBILE COMMUNICATION SYSTEM, BASE STATION, USER TERMINAL, AND PROCESSOR

(71) Applicant: KYOCERA CORPORATION, Kyoto (JP)

(72) Inventors: Masato Fujishiro, Yokohama (JP); Takahiro Saiwai, Kawasaki (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/789,358

(22) Filed: Oct. 20, 2017

(65) Prior Publication Data

US 2018/0042063 A1     Feb. 8, 2018

Related U.S. Application Data

(63) Continuation of application No. 15/198,142, filed on Jun. 30, 2016, now Pat. No. 9,801,221, which is a
(Continued)

(51) Int. Cl.
*H04B 7/00* (2006.01)
*H04W 72/04* (2009.01)
(Continued)

(52) U.S. Cl.
CPC .......... *H04W 76/14* (2018.02); *H04W 8/005* (2013.01); *H04W 72/04* (2013.01); *H04W 72/0453* (2013.01); *H04W 76/023* (2013.01)

(58) Field of Classification Search
CPC ............. H04W 72/04; H04W 72/0453; H04W 76/023; H04W 8/005; H04W 72/042;
(Continued)

(56) References Cited

U.S. PATENT DOCUMENTS 6,081,721 A      6/2000  Suzuki et al.
9,485,798 B2 *  11/2016  Fujishiro ............... H04W 8/005
(Continued)

FOREIGN PATENT DOCUMENTS

JP        H10-154969 A      6/1998
WO      2011/130623 A2    10/2011
(Continued)

OTHER PUBLICATIONS

International Search Report; PCT/JP2013/068791; dated Oct. 8, 2013.
(Continued)

*Primary Examiner* — Eugene Yun
(74) *Attorney, Agent, or Firm* — Studebaker & Brackett PC

(57) ABSTRACT

A radio base station, user terminal, and apparatus in a mobile communication system including a plurality of cells corresponding to a plurality of frequency bands are configured to either transmit or receive a system information block indicating radio resources. The radio resources are used by a user terminal to transmit and/or receive a direct discovery signal for discovering another user terminal in proximity of the user terminal. The system information block includes information indicating a cycle of time resources reserved as the radio resources, information indicating one or more frequency bands selected from the plurality of frequency bands, and information indicating one or more resource blocks reserved as the radio resources in the one or more frequency bands. The radio base station, user terminal, and apparatus further configured to either transmit or receive change notification information, relating to a change of the radio resources, separately from the system information block.

3 Claims, 13 Drawing Sheets

Related U.S. Application Data continuation of application No. 14/424,002, filed as application No. PCT/JP2013/068791 on Jul. 9, 2013, now Pat. No. 9,485,798.

(60) Provisional application No. 61/694,590, filed on Aug. 29, 2012.

(51) Int. Cl.
*H04W 76/02* (2009.01)
*H04W 8/00* (2009.01)

(58) Field of Classification Search
CPC .......... H04W 72/0406; H04W 76/025; H04W 72/1205
USPC ....................................... 455/41.2
See application file for complete search history.

(56) References Cited

U.S. PATENT DOCUMENTS

| | | |
|---|---|---|
| 2011/0106952 A1 | 5/2011 | Doppler et al. |
| 2011/0258313 A1 | 10/2011 | Mallik et al. |
| 2013/0016629 A1 | 1/2013 | Mallik et al. |
| 2013/0109301 A1 | 5/2013 | Hakola et al. |
| 2013/0188546 A1 | 7/2013 | Turtinen et al. |
| 2014/0254429 A1 | 9/2014 | Wang et al. |
| 2015/0117239 A1 | 4/2015 | Lindoff et al. |
| 2015/0163729 A1 | 6/2015 | Seo et al. |
| 2015/0223147 A1 | 8/2015 | Fujishiro et al. |

FOREIGN PATENT DOCUMENTS

| | | |
|---|---|---|
| WO | 2011/130630 A1 | 10/2011 |
| WO | 2012/145724 A1 | 10/2012 |
| WO | 2013/177179 A1 | 11/2013 |
| WO | 2014/113537 A1 | 7/2014 |

OTHER PUBLICATIONS

3GPP TR 22.803 V0.3.0 (May 2012); 3rd Generation Partnership Project; Technical Specification Group SA; Feasibility Study for Proximity Services (ProSe)(Release 12).

Qualcomm; "3GPP RAN Rel-12 & Beyond"; 3GPP TSG RAN workshop on REL-12 and onwards RWS-120007; Jun. 11, 2012.

The extended European search report issued by the European Patent Office dated Mar. 22, 2016, which corresponds to European Patent Application No. 13832312.6-1864 and is related to U.S. Appl. No. 14/424,002.

Samsung; "Resource Configuration & Selection for D2D Direct Discovery"; 3GPP TSG RAN WG2 Meeting #83; R2-132526; Aug. 19-23, 2013; pp. 1-4; Barcelona, Spain.

JPO Office Action from corresponding JP Appl No. 2016-079059, dated Jun. 21, 2016 with concise explanation, 5. pp.

An Office Action; "Notice of Reasons for Rejection," issued by the Japanese Patent Office on Mar. 7, 2017, which corresponds to Japanese Patent Application No. 2016-230402 and is related to U.S. Appl. No. 15/198,142; with English language statement of relevance.

* cited by examiner

FIG. 8
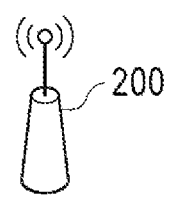
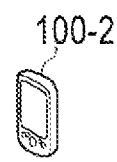
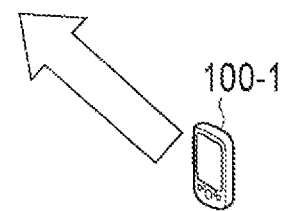

MOBILE COMMUNICATION SYSTEM, BASE STATION, USER TERMINAL, AND PROCESSOR

CROSS-REFERENCE TO RELATED APPLICATIONS

This application is a Continuation Application of U.S. patent application Ser. No. 15/198,142 filed Jun. 30, 2016, which is a Continuation Application of U.S. patent application Ser. No. 14/424,002 filed Feb. 25, 2015, which is the U.S. National Phase Application of International Application No. PCT/JP2013/068791 filed Jul. 9, 2013, which claims benefit of U.S. Provisional Application No. 61/694,590 filed Aug. 29, 2012, the entire contents of which are incorporated herein by reference.

TECHNICAL FIELD

The present disclosure relates to a mobile communication system that supports D2D communications.

BACKGROUND ART

In 3GPP (3rd Generation Partnership Project) which is a project aiming to standardize mobile communication systems, the introduction of Device to Device (D2D) communications is discussed as a new function after Release 12 (see Non Patent Document 1).

In the D2D communications, a plurality of user terminals close to one another perform direct radio communications in a frequency band assigned to a mobile communication system. In addition, the D2D communications is also called Proximity Service communications.

CITATION LIST

Non-Patent Document

NON-PATENT DOCUMENT 1: 3GPP technical report "TR 22. 803 V0.3.0" May 2012

SUMMARY

In the current specifications, it is problematic that there is no mechanism for appropriately controlling the D2D communications.

Therefore, the present disclosure provides a base station, user terminal, and apparatus including at least one processor capable of appropriately controlling D2D communication.

According to an embodiment, a radio base station in a mobile communication system including a plurality of cells corresponding to a plurality of frequency bands includes a transmitter configured to transmit to a user terminal a system information block indicating radio resources. The radio resources are used by the user terminal to transmit and/or receive a direct discovery signal for discovering another user terminal in proximity of the user terminal. The system information block includes information indicating a cycle of time resources reserved as the radio resources, information indicating one or more frequency bands selected from the plurality of frequency bands, and information indicating one or more resource blocks reserved as the radio resources in the one or more frequency bands. The transmitter is further configured to transmit, to the user terminal, a change notification information separately from the system information block. The change notification information relates to a change of the radio resources.

According to an embodiment, a user terminal in a mobile communication system including a plurality of cells corresponding to a plurality of frequency bands includes a receiver configured to receive a system information block indicating radio resources, from a radio base station. The radio resources are used by the user terminal to transmit and/or receive a direct discovery signal for discovering another user terminal in proximity of the user terminal. The system information block includes information indicating a cycle of time resources reserved as the radio resources, information indicating one or more frequency bands selected from the plurality of frequency bands, and information indicating one or more resource blocks reserved as the radio resources in the one or more frequency bands. The receiver is further configured to receive, from the radio base station, a change notification information separately from the system information block. The change notification information relates to a change of the radio resources.

According to an embodiment, an apparatus for a user terminal in a mobile communication system including a plurality of cells corresponding to a plurality of frequency bands includes one or more processors configured to cause the user terminal to receive, from a radio base station, a system information block indicating radio resources. The radio resources are used by the user terminal to transmit and/or receive a direct discovery signal for discovering another user terminal in proximity of the user terminal. The system information block includes information indicating a cycle of time resources reserved as the radio resources, information indicating one or more frequency bands selected from the plurality of frequency bands, and information indicating one or more resource blocks reserved as the radio resources in the one or more frequency bands. The one or more processors are further configured to cause the user terminal to receive, from the radio base station, a change notification information separately from the system information block. The change notification information relates to a change of the radio resources.

BRIEF DESCRIPTION OF THE DRAWINGS

FIG. 8 is a diagram illustrating discovery signals.

DESCRIPTION OF EMBODIMENTS

First Embodiment (Overview of First Embodiment)

Figure 1:
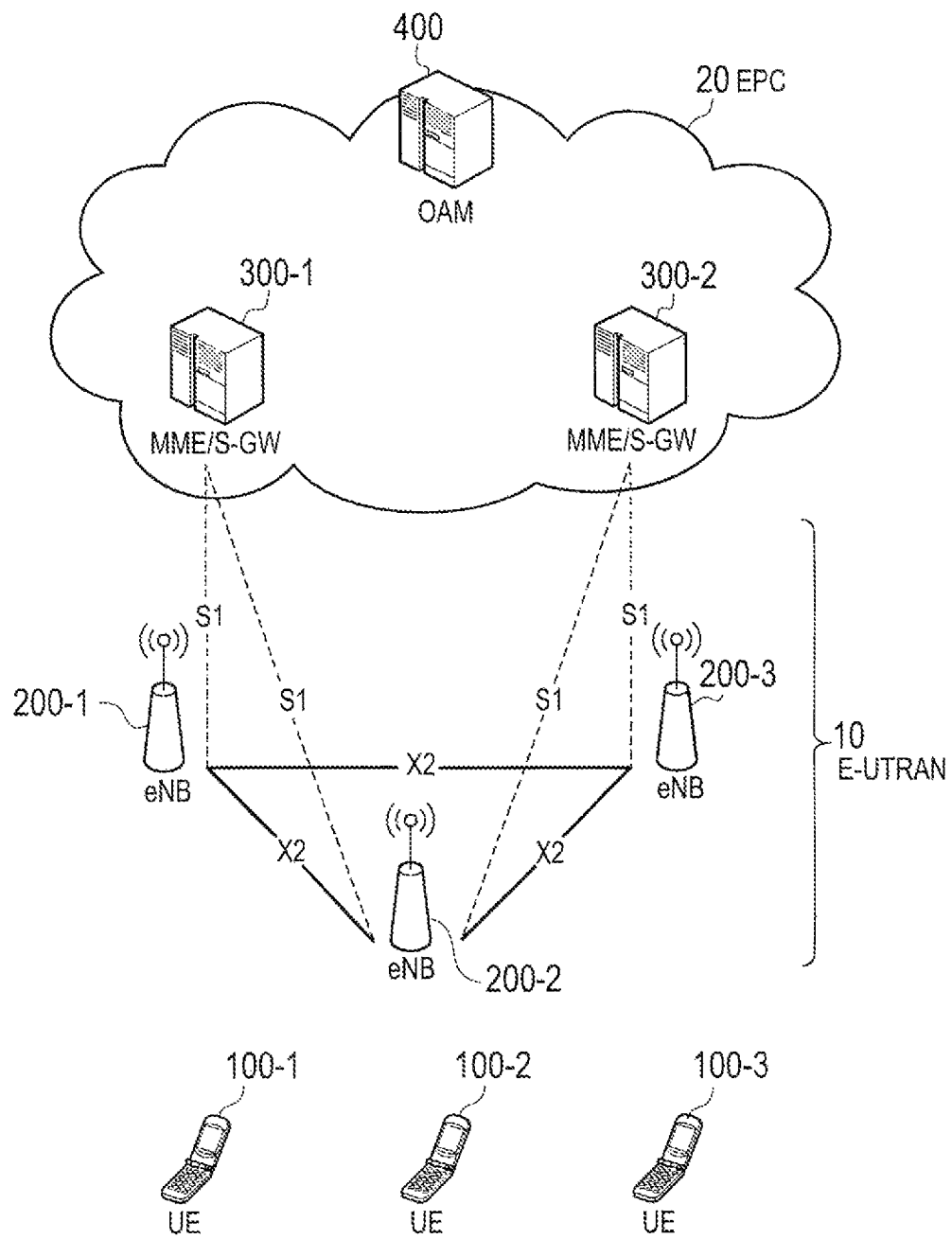
FIG. 1 is a configuration diagram of an LTE system.

A mobile communication system according to a first embodiment supports D2D communication that is direct inter-terminal radio communication. The mobile communication system includes a user terminal that transmits and receives discovery signals for a discovery process of a communication target terminal of the D2D communication, and a base station that transmits discovery resource information indicating radio resources to be used for transmitting and receiving the discovery signals. When the discovery resource information is received from the base station, the user terminal transmits and receives the discovery signals by using the radio resource indicated by the received discovery resource information. Accordingly, the base station is able to designate the radio resource to be used for transmitting and receiving the discovery signals, so that the user terminal is able to transmit and receive the discovery signals by using the appropriate radio resource. Therefore, it is possible to appropriately control the D2D communication.

In the first embodiment, when the radio resource to be used for transmitting and receiving the discovery signals is changed, the base station transmits discovery resource information indicating the changed radio resource. Accordingly, it is possible to change the radio resource to be used for transmitting and receiving the discovery signals depending on each situation.

In the first embodiment, the discovery signals includes a search signal transmitted so as to search for the communication target terminal, and a response signal replied in response to the reception of the search signal. The discovery resource information includes first information indicating radio resources to be used for transmitting and receiving the search signal, and second information indicating radio resources to be used for transmitting and receiving the response signal. Accordingly, individual radio resources can be designated for the search signal and the response signal, respectively, so that it is possible to prevent the generation of interference between the search signal and the response signal.

In the first embodiment, when the radio resource to be used for transmitting and receiving the discovery signals has been reserved, the base station uses the reserved radio resource only for the transmission and reception of the discovery signals. Accordingly, it is possible to prevent the generation of interference between the transmission and reception of the discovery signals and other communication (for example, cellular communication). Furthermore, when cooperation with a neighbor cell is carried out, it becomes possible to perform a discovery process (Discovery) for a user terminal subordinate to the neighbor cell.

In the first embodiment, the discovery resource information includes information indicating a frequency resource to be used for transmitting and receiving the discovery signals. The frequency resource is at least one of: a communication frequency band; and a resource block included in the communication frequency band. Accordingly, the base station is able to designate the frequency resource to be used for transmitting and receiving the discovery signals, so that the user terminal is able to transmit and receive the discovery signals by using the appropriate frequency resource.

In the first embodiment, the discovery resource information includes information indicating a time resource to be used for transmitting and receiving the discovery signals. The time resource is at least one of a radio frame, a subframe included in the radio frame, and a symbol included in the subframe. Accordingly, the base station is able to designate the time resource to be used for transmitting and receiving the discovery signals, so that the user terminal is able to transmit and receive the discovery signals by using the appropriate time resource.

In the first embodiment, the base station notifies a neighbor base station of the radio resource to be used for transmitting and receiving the discovery signals. Accordingly, the neighbor base station is able to recognize an operation status of a discovery signal resource at the base station.

Hereinafter, with reference to the drawings, a description will be provided for an embodiment when the D2D communication is introduced to a cellular mobile communication system (hereinafter, an "LTE system") configured to conform to the 3GPP standards.

(LTE System)

FIG. 1 is a configuration diagram of an LTE system according to the first embodiment.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 that establishes a connection with the cell.

In addition, the "cell" is used as a term indicating a minimum unit of radio communication areas, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMEs (Mobility Management Entities)/S-GWs (Serving-Gateways) 300, and OAM (Operation and Maintenance) 400.

The MME is a network node for performing various mobility controls, etc., for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
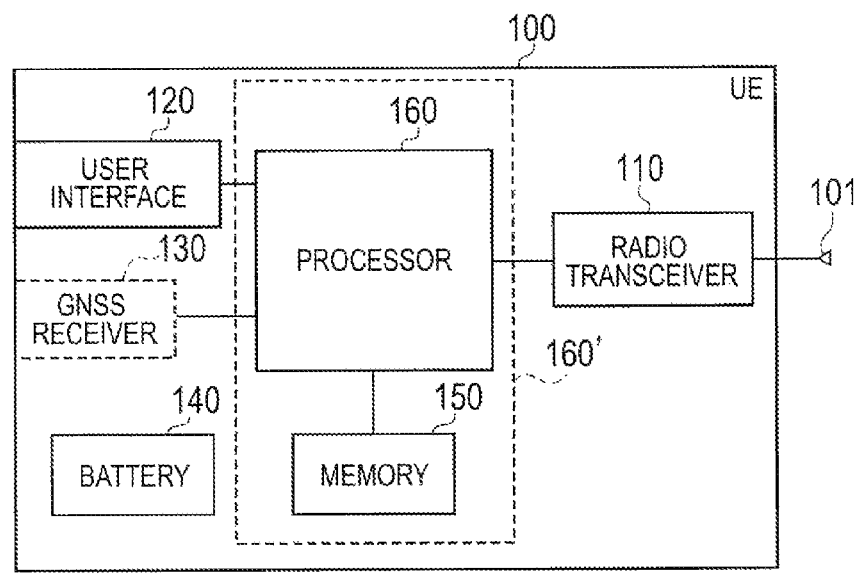
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor configured to perform modulation and demodulation, coding and decoding and the like of the baseband signal, and a CPU (Central Processing Unit) configured to perform various processes by executing the program stored in the memory 150. The processor 160 may further include a codec that performs encoding and decoding of sound and video signals. The processor 160 implements various processes and various communication protocols described later.

Figure 3:
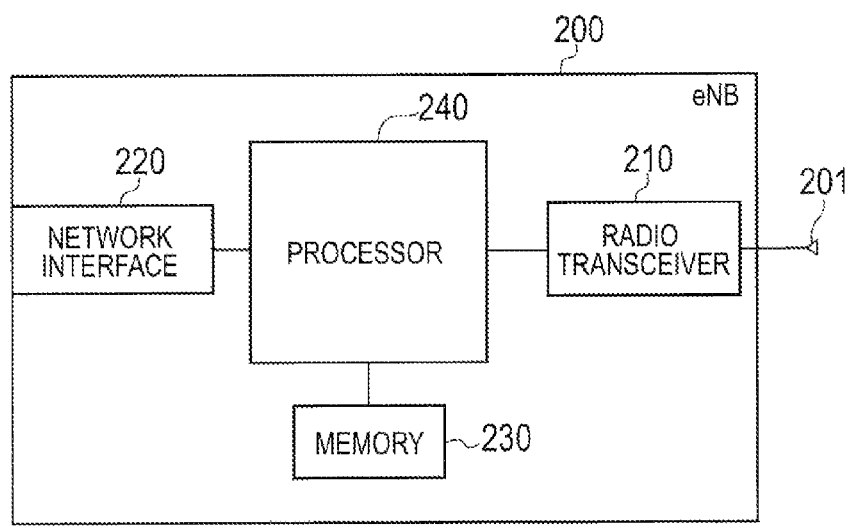
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighbor eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, and encoding and decoding of the baseband signal and a CPU that perform various processes by executing the program stored in the memory 230. The processor 240 implements various processes and various communication protocols described later.

Figure 4:
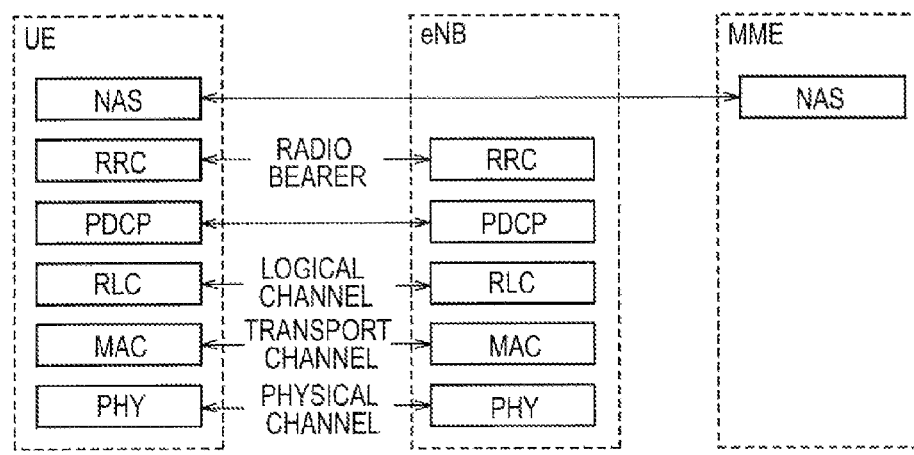
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted through a transport channel. The MAC layer of the eNB 200 includes a transport format of an uplink and a downlink (a transport block size, a modulation and coding scheme, and the like) and a MAC scheduler for determining a resource block to be assigned.

The RLC layer transmits data to an RLC layer of a reception side by using the functions of the MAC layer and the PHY layer. Between the RLC layer of the UE 100 and the RLC layer of the eNB 200, data is transmitted through a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

A NAS (Non-Access Stratum) layer positioned above the RRC layer performs session management or mobility management, for example.

Figure 5:
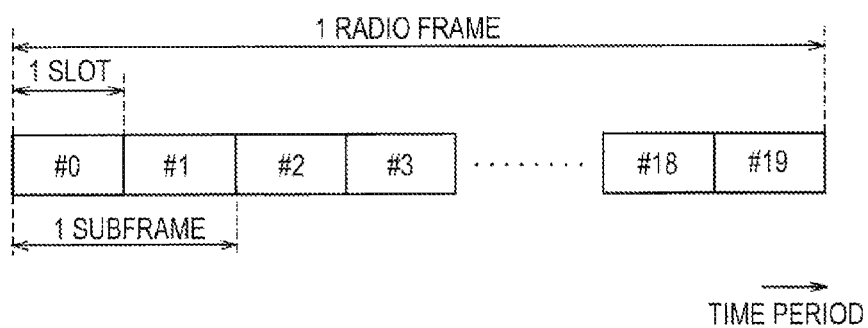
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As illustrated in FIG. 5, the radio frame is configured by 10 subframes arranged in a time-period direction, wherein each subframe is configured by two slots arranged in the time-period direction. Each subframe has a length of 1 ms and each slot has a length of 0.5 ms. Each subframe includes a plurality of resource blocks (RBs) in a frequency direction, and a plurality of symbols in the time-period direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among the radio resources assigned to the UE 100, a frequency resource can be designated by a resource block and a time resource can be designated by a subframe (or a slot).

In the downlink, an interval of several symbols at the head of each subframe is a control region mainly used as a physical downlink control channel (PDCCH). Furthermore, the remaining interval of each subframe is a region mainly used as a physical downlink shared channel (PDSCH). Moreover, in each subframe, cell-specific reference signals (CRSs) are distributed and arranged.

In the uplink, both ends in the frequency direction of each subframe are control regions mainly used as a physical uplink control channel (PUCCH). Furthermore, the center portion in the frequency direction of each subframe is a region mainly used as a physical uplink shared channel (PUSCH). Moreover, in each subframe, a demodulation reference signal (DMRS) and a sounding reference signal (SRS) are arranged.

(D2D Communication)

Next, the D2D communication will be described with comparing the normal communication (the cellular communication) in the LTE system.

Figure 6:
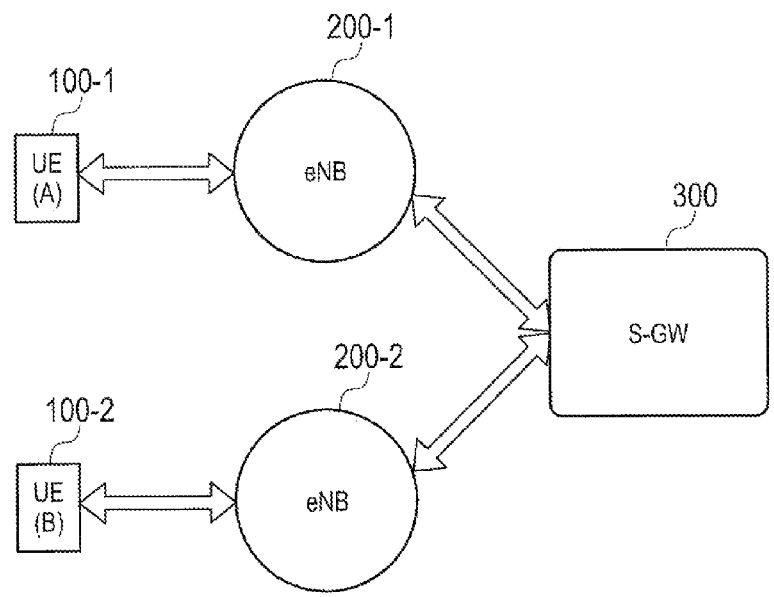
FIG. 6 is a diagram illustrating a data path in cellular communication.

FIG. 6 illustrates a data path in the cellular communication. FIG. 6 illustrates the case in which the cellular communication is performed between UE 100-1 that establishes a connection with eNB 200-1 and UE 100-2 that establishes a connection with eNB 200-2. In addition, the data path indicates a transfer path of user data (a user plane).

As illustrated in FIG. 6, the data path of the cellular communication passes through the network. Specifically, the data path is set to pass through the eNB 200-1, the S-GW 300, and the eNB 200-2.

Figure 7:
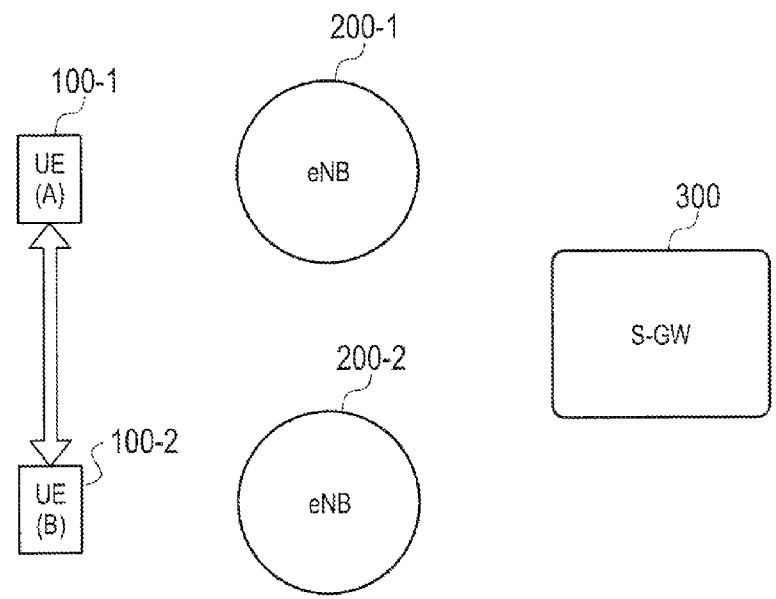
FIG. 7 is a diagram illustrating a data path in D2D communication.

FIG. 7 illustrates a data path in the D2D communication. FIG. 7 illustrates the case in which the D2D communication is performed between the UE 100-1 that establishes a connection with the eNB 200-1 and the UE 100-2 that establishes a connection with the eNB 200-2. In this case, the UE 100-1 and the UE 100-2 constitute a D2D group.

For example, one UE 100 of the UE 100-1 and the UE 100-2 discovers the other UE 100 existing in the vicinity of the one UE 100, so that the D2D communication starts. In addition, in order to start the D2D communication, the UE 100 has a (Discover) function of discovering another UE 100 existing in the vicinity of the UE 100. Furthermore, the UE 100 has a (Discoverable) function discovered by another UE 100.

As illustrated in FIG. 7, the data path of the D2D communication does not pass through the network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the network and a battery consumption amount of the UE 100 are reduced, for example. In addition, the data path passes through the eNB 200, not through the S-GW 300, in a special mode called Locally Routed.

Furthermore, the D2D communication is considered to be performed in a frequency band of the LTE system, and for example, in order to avoid interference to the cellular communication, the D2D communication is performed under the control of the network (eNB 200). A radio resource assignment scheme in the D2D communication mainly includes the following two schemes.

According to the first assignment scheme, the UE 100 is able to select radio resources to be used in the D2D communication. Specifically, the eNB 200 transmits, to the UE 100, information indicating assignment candidate radio resources that are radio resources available for the D2D communication. The UE 100 autonomously selects radio resources to be used in the D2D communication from the assignment candidate radio resources.

According to the second assignment scheme, the eNB 200 determines radio resources to be used in the D2D communication. That is, the UE 100 has no selection right of the radio resource to be used in the D2D communication. Specifically, the eNB 200 transmits, to the UE 100, information indicating radio resources dynamically or quasi-statically assigned for the D2D communication. The UE 100 performs the D2D communication by using the assigned radio resource.

(Discovery Process)

The UE 100 transmits a search signal (Discovery signal) for searching for another UE 100 existing in the vicinity of the UE 100, before the start of the D2D communication. Alternatively, the UE 100 transmits a search signal (Discoverable signal) for being searched by another UE 100 if the start of the D2D communication is desired. In the first embodiment, the case in which the UE 100 transmits the Discovery signal will be described.

FIG. 8 is a diagram illustrating a discovery process.

Firstly, as illustrated in FIG. 8, in order to start the D2D communication, the UE 100-1 that searches for UE existing in the vicinity of the UE 100-1 transmits a Discovery signal. The UE 100-2 attempts to receive the Discovery signal in order to start the D2D communication.

Secondly, the UE 100-2 discovers the UE 100-1 when the Discovery signal is received from the UE 100-1, and transmits (replies) to the UE 100-1, a Discovery response signal that is a response signal for the Discovery signal. The UE 100-1 discovers the UE 100-2 in response to the reception of the Discovery response signal from the UE 100-2.

Note that the transmission of the Discovery response signal is not essential, and may be omitted. In this case, the UE 100-2 that has received the Discovery signal notifies a network a result thereof. By an assist of the network, the UEs 100-1 and 100-2 become status discovered mutually.

Hereinafter, the Discovery signals and the Discovery response signals will be collectively called "discovery signals".

Thirdly, at least one of the UE 100-1 and the UE 100-2 transmits, to the eNB 200, a D2D communication request for starting the D2D communication. As a result, the D2D communication is started under the control of the eNB 200.

In the first embodiment, the discovery signals are transmitted and received within a frequency band assigned to a mobile communication system. The discovery signals may be transmitted and received, by using radio resources available for the D2D communication, within the frequency band assigned to the mobile communication system.

Alternatively, the discovery signals may be transmitted and received, by using radio resources unavailable for the D2D communication, within the frequency band assigned to the mobile communication system. For example, the discovery signals can be transmitted and received in 1.5 GHz band while the D2D communication is performed in 2 GHz band.

(Operation According to First Embodiment)

In FIG. 8, it is difficult for the UE 100-2 to receive a Discovery signal without recognizing which radio resource to use when the UE 100-1 transmits the Discovery signal. Similarly, it is difficult for the UE 100-1 to receive a Discovery response signal without recognizing which radio resource to use when the UE 100-2 transmits the Discovery response signal. Particularly, these problems are remarkable under a communication environment in which a plurality of communication frequency bands (multiband) exist.

Figure 9:
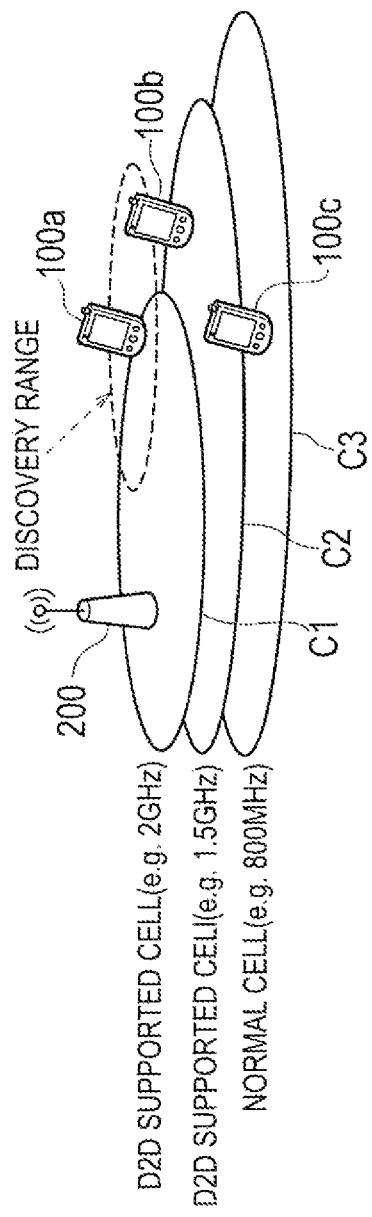
FIG. 9 is a diagram illustrating a communication environment in which a plurality of communication frequency bands exist.

FIG. 9 is a diagram illustrating a communication environment in which a plurality of communication frequency bands exist.

As illustrated in FIG. 9, the eNB 200 manages three cells C1 to C3 corresponding to three communication frequency bands, and each cell accommodates UEs 100a to 100c. The cells C1 and C2, among the cells C1 to C3, are cells that support the D2D communication. Furthermore, the UEs 100a to 100c are geographically close to each other.

The UE 100a accommodated in the cell C1 transmits the Discovery signal in a communication frequency band corresponding to the cell C1 in order to start the D2D communication. In contrast, the UE 100b accommodated in the cell C2 attempts to receive the Discovery signal in a communication frequency band corresponding to the cell C2 in order to start the D2D communication. As a result, although the UE 100a and the UE 100b are close to each other, the UE 100a and the UE 100b are not able to start the D2D communication because of not being able to discover each other.

Therefore, in the first embodiment, the eNB 200 transmits, to the UE 100a and the UE 100b, discovery resource information indicating radio resources to be used for transmitting and receiving the discovery signals (the Discovery signal and the Discovery response signal).

Hereinafter, the radio resources to be used for transmitting and receiving the discovery signals will be called "Discovery resources", and the discovery resource information will be called "Discovery resource information".

The Discovery resource information may be transmitted in a broadcast manner or a unicast manner. Hereinafter, the case in which the Discovery resource information is transmitted in the broadcast manner will be mainly described. For example, the eNB 200 transmits the Discovery resource information while including it in a system information block (SIB).

When the Discovery resource information is received from the eNB 200, the UE 100a and the UE 100b transmits and receives the discovery signals (the Discovery signal and the Discovery response signal) by using the Discovery resource indicated by the received Discovery resource information. As a result, the UE 100a and the UE 100b are able to start the D2D communication because of being able to normally transmit and receive the discovery signals and to discover each other.

Figure 10:
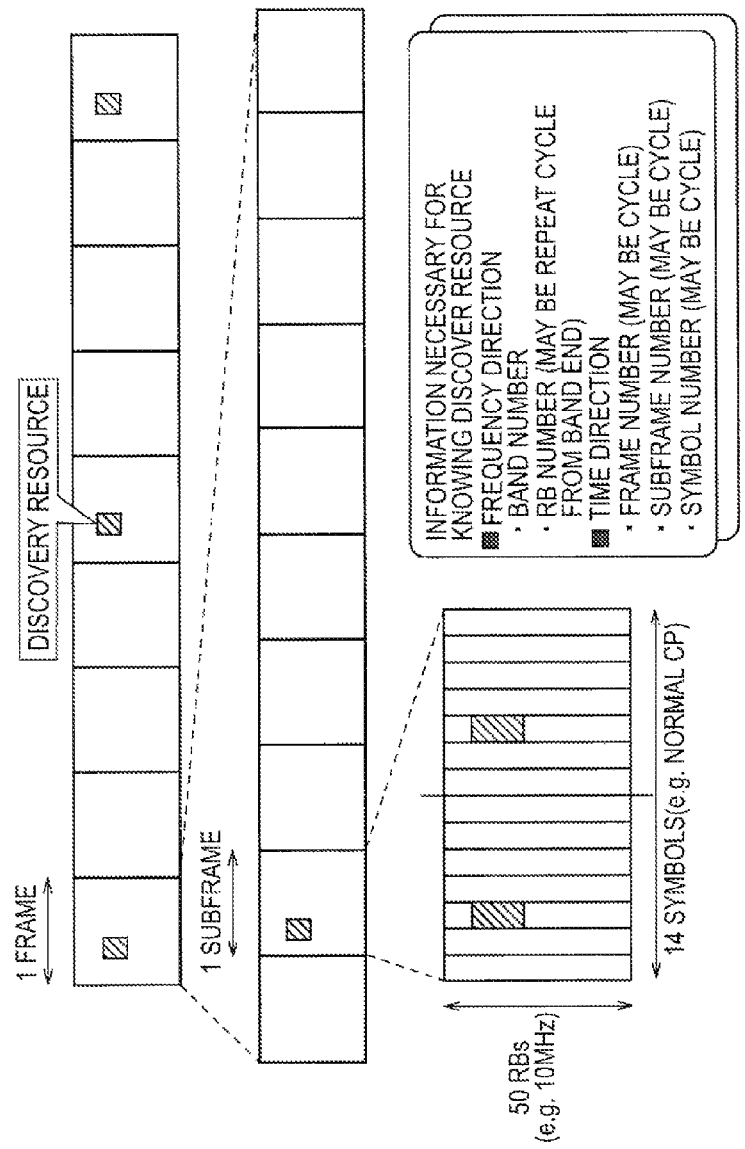
FIG. 10 is a diagram illustrating Discovery resource information according to a first embodiment.

Next, the Discovery resource information will be described. FIG. 10 is a diagram illustrating the Discovery resource information.

As illustrated in FIG. 10, the Discovery resource is provided at a specific resource block in a specific communication frequency band in the frequency direction. Furthermore, the Discovery resource is provided at a specific symbol in a specific subframe in the time-period direction.

As described above, the Discovery resource information is information indicating the Discovery resource.

Specifically, the Discovery resource information includes information indicating a frequency resource to be used for transmitting and receiving the discovery signals. The frequency resource is at least one of: a communication frequency band; and a resource block included in the communication frequency band.

Furthermore, the Discovery resource information includes information indicating a time resource to be used for transmitting and receiving the discovery signals. The time resource is at least one of a radio frame, a subframe included in the radio frame, and a symbol included in the subframe.

Moreover, in the first embodiment, the eNB 200 may reserve different Discovery resources for the Discovery signal and the Discovery response signal, respectively. In this case, the Discovery resource information includes first information indicating a Discovery resource to be used for transmitting and receiving the Discovery signal, and second information indicating a Discovery resource to be used for transmitting and receiving the Discovery response signal.

Furthermore, when the Discovery resource has been reserved, the eNB 200 may use the reserved Discovery resource only for the purpose of transmitting and receiving the discovery signals (does not use for a shared channel, for example).

Moreover, the eNB 200 is able to dynamically change the Discovery resource depending on each situation such as a usage status of the radio resource or a generation status of interference, or both of them. When the Discovery resource is changed, the eNB 200 transmits the Discovery resource information indicating the changed Discovery resource.

When the Discovery resource is dynamically changed, the UE 100 that attempts to start the D2D communication needs to monitor the Discovery resource information at all times in order to recognize the change of the Discovery resource, and to decrypt the received Discovery resource information. In order to reduce such processing load of the UE 100, Discovery resource information may include change information indicating that the Discovery resource has been changed. In this case, the UE 100 normally monitors and decrypts the change information among the Discovery resource information, and only when the change information indicates "changed", decrypts another piece of information among the Discovery resource information. In addition, the eNB 200 may transmit the change information and the other piece of information while including them in separate system information blocks (SIBs).

Figure 11:
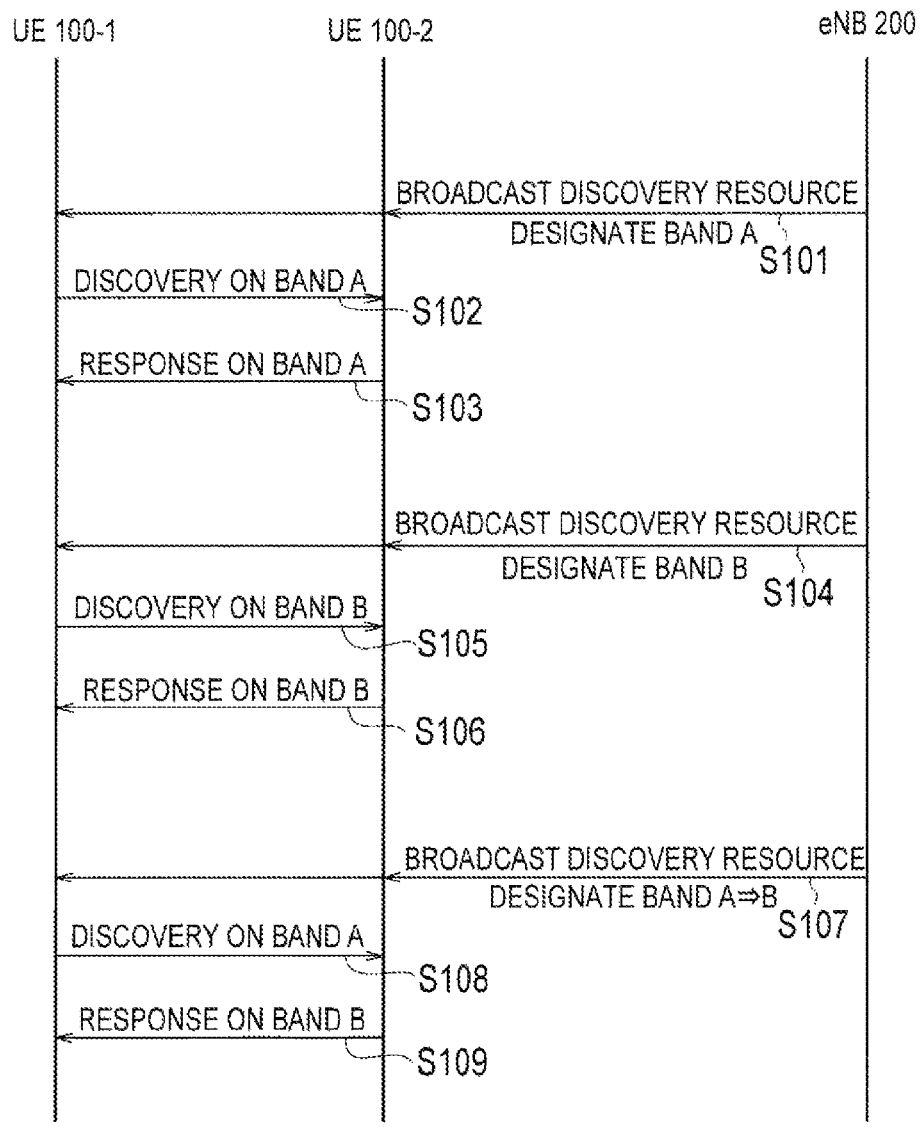
FIG. 11 is an operation sequence diagram of the eNB and the UE according to the first embodiment.

FIG. 11 is an operation sequence diagram of the eNB 200 and the UE 100 according to the first embodiment. Hereinafter, an operation example in the case in which the eNB 200 is operated in the plurality of communication frequency bands (multiband) will be described.

As illustrated in FIG. 11, in step S101, the eNB 200 transmits the Discovery resource information indicating the Discovery resource included in a band A in the broadcast manner. The UE 100-1 and the UE 100-2 receive the Discovery resource information from the eNB 200.

In step S102, the UE 100-1 transmits the Discovery signal by using the Discovery resource indicated by the Discovery resource information received in step S101. The UE 100-2 receives the Discovery signal from the UE 100-1.

In step S103, the UE 100-2 transmits, to the UE 100-1, the Discovery response signal in response to the reception of the Discovery signal in step S102. The UE 100-1 receives the Discovery response signal from the UE 100-2.

If the operations of step S102 and step S103 are completed normally, the D2D communication is to be started. Hereinafter, the case in which the operations of step S102 and step S103 are not completed normally and the discovery process is to be continued will be described.

In step S104, the eNB 200 transmits the Discovery resource information indicating the Discovery resource included in a band B in the broadcast manner. The UE 100-1 and the UE 100-2 receive the Discovery resource information from the eNB 200.

In step S105, the UE 100-1 transmits the Discovery signal by using the Discovery resource indicated by the Discovery resource information received in step S104. The UE 100-2 receives the Discovery signal from the UE 100-1.

In step S106, the UE 100-2 transmits, to the UE 100-1, the Discovery response signal in response to the reception of the Discovery signal in step S105. The UE 100-1 receives the Discovery response signal from the UE 100-2.

If the operations of step S105 and step S106 are completed normally, the D2D communication is to be started. Hereinafter, the case in which the operations of step S105 and step S106 are not completed normally and the discovery process is to be continued will be described.

Here, it is determined that the eNB 200 changes the Discovery resource included in the band A into that in the band B.

In step S107, the eNB 200 transmits the Discovery resource information indicating the Discovery resource included in the band B according to the change in the broadcast manner. The UE 100-1 and the UE 100-2 receive the Discovery resource information from the eNB 200.

In step S108, the UE 100-1 transmits the Discovery signal by using the Discovery resource indicated by the Discovery resource information received in step S107. The UE 100-2 receives the Discovery signal from the UE 100-1.

In step S109, the UE 100-2 transmits, to the UE 100-1, the Discovery response signal in response to the reception of the Discovery signal in step S108. The UE 100-1 receives the Discovery response signal from the UE 100-2.

(Conclusion of First Embodiment)

According to the first embodiment, the eNB 200 is able to designate the Discovery resource, so that the UE 100 is able to transmit and receive the discovery signals by using the appropriate Discovery resource. Therefore, it is possible to appropriately control the D2D communication.

When the Discovery resource is changed, the eNB 200 transmits the Discovery resource information indicating the changed Discovery resource. Accordingly, it is possible to change the Discovery resource depending on each situation.

The Discovery resource information includes at least one of the first information indicating the Discovery resource to be used for transmitting and receiving the Discovery signal, and the second information indicating the Discovery resource to be used for transmitting and receiving the Discovery response signal. Accordingly, individual Discovery resources can be designated for the Discovery signal and the Discovery response signal, respectively.

When the Discovery resource has been reserved, the eNB 200 uses the reserved Discovery resource only for the transmission and reception of the discovery signals. Accordingly, it is possible to prevent the generation of interference between the transmission and reception of the discovery signals and other communication (for example, cellular communication).

The Discovery resource information includes the information indicating the frequency resource to be used for transmitting and receiving the discovery signals. The frequency resource is at least one of: a communication frequency band; and a resource block included in the communication frequency band. Accordingly, the eNB 200 is able to designate the frequency resource to be used for transmitting and receiving the discovery signals, so that the UE 100 is able to transmit and receive the discovery signals by using the appropriate frequency resource.

The Discovery resource information includes information indicating the time resource to be used for transmitting and receiving the discovery signals. The time resource is at least one of a radio frame, a subframe included in the radio frame, and a symbol included in the subframe. Accordingly, the eNB 200 is able to designate the time resource to be used for transmitting and receiving the discovery signals, so that the UE 100 is able to transmit and receive the discovery signals by using the appropriate time resource.

[Modification of First Embodiment]

For example, the eNB 200 may notify a neighbor eNB of a Discovery resource. In this case, the eNB 200 may directly notify the neighbor eNB on the X2 interface, or may indirectly notify the neighbor eNB on the S1 interface. The neighbor eNB 200 that receives such notification is able to recognize an operation status of the Discovery resource at the eNB 200 that is a notification source.

Second Embodiment

Next, a second embodiment will be described while focusing on the differences from the first embodiment. The system configuration of the second embodiment is similar to the first embodiment.

(Overview of Second Embodiment)

A base station (eNB) according to the second embodiment manages a cell. The base station changes the amount of radio resources reserved as discovery resources (Discovery Resource), based on parameters related to user terminals in the cell.

In the second embodiment, the base station changes the amount of radio resources reserved as the discovery resources, by changing the cycle of time resources reserved as the discovery resource.

In the second embodiment, the cycle of time resources reserved as the discovery resources is set to an integer multiple of the shortest cycle shared by the cell and neighbor cells.

In the second embodiment, the parameters related to the user terminal (UE) within the cell, is the number of user terminals located in the cell.

In the second embodiment, the parameters related to the user terminals in the cell is a frequency of handover of user terminals from neighbor cells to the cell, and/or a frequency of handover of user terminals from the cell to neighbor cells. Moreover, the base station changes the amount of radio resources reserved as the discovery resources, and transmits the setting information for changing the transmission interval of the discovery signals to the user terminal within the cell.

(Operation According to Second Embodiment)

Figure 12:
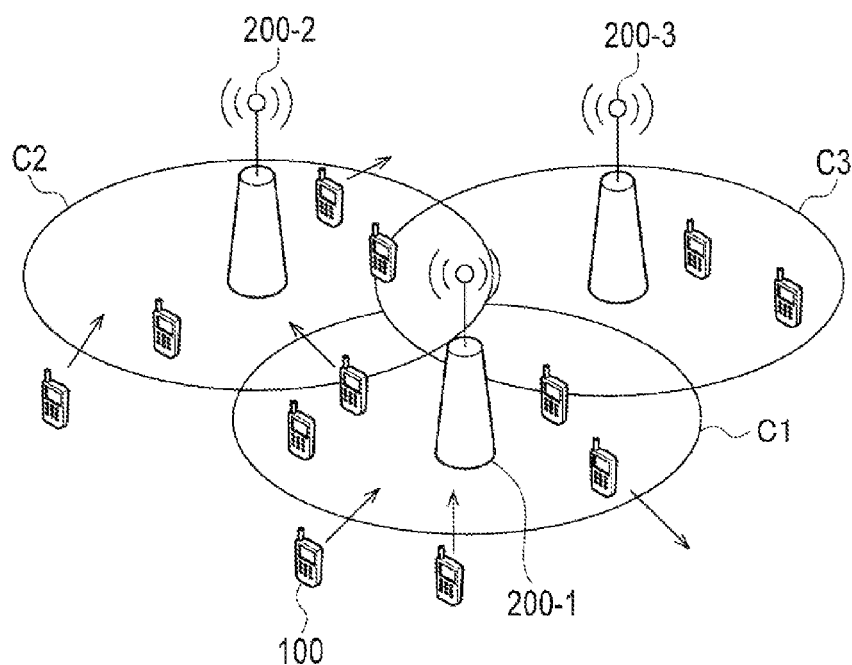
FIG. 12 is a diagram for explaining an operating environment according to a second embodiment.

FIG. 12 is a diagram for explaining an operating environment according to the second embodiment.

As illustrated in FIG. 12, a plurality of eNBs 200 (eNB 200-1 to eNB 200-3) are installed. The eNB 200-1 manages a cell C1, the eNB 200-2 managed a cell C2, and the eNB 200-3 manages a cell C3. The cells C1 to C3 are adjacent to each other.

In cells C1 to C3, regarding the number of UEs 100, the cell C1 is the most, cell C2 is the next most, and cell C3 is the smallest. Here, the "exist", it does not matter whether UE 100 is the connected state or the idle state. If many adjacent UEs 100 transmit and receive discovery signals (Discovery signals) by limited Discovery resources, the Discovery resources per one UE are reduced. Thus, for the cell where many UEs 100 exist, it is preferable to increase the amount of Discovery resources.

In addition, in cells C1 to C3, regarding the number of UEs 100 entering and leaving, the cell C1 is the most, the cell C2 is the next most, and the cell C3 is the smallest. The UE 100 entering and leaving the cell, includes idle state UEs 100 enter and leave the cell by a cell reselection and connected state UEs 100 enter and leave the cell by a handover. A cell where the number of UEs 100 entering and leaving is large can be regarded as a cell where the number of moving UEs 100 is large. When a moving UE 100 transmits and receives discovery signals (Discovery signal) for D2D communications with a long cycle, a discovery of a peer UE is difficult because it is not possible to follow the change in the communication environment. Thus, it is preferable, for the cell where many UEs 100 enter and leave, to shorten the cycle of the discovery signal and increase the amount of Discovery resources.

Therefore, the eNB 200 according to the second embodiment changes the amount of radio resources reserved as the Discovery resources, based on parameters related to UEs 100 in own cell. The "UEs 100 in own cell" means "at least UEs 100 in the own cell" and may be "UEs 100 in tracking area including the own cell."

In the second embodiment, the parameters related to UEs 100 in own cell are the number of UEs 100 existing in the own cell. Preferably, "the number of UEs 100 existing in the own cell" is number of UEs 100 transmitting and receiving discovery signals in the own cell. It is assumed that the UEs 100 transmitting and receiving discovery signals may communicate with the eNB 200 to transmit and receive the discovery signals. Thus, the eNB 200 can change the amount of radio resources reserved as the Discovery resources, based on the number of UEs 100 transmitting and receiving discovery signals in the own cell. Alternatively, "the number of UEs 100 existing in the own cell" may be the number of UEs 100 supporting D2D communications in the own cell. In this case, the UE 100 notifies information on a support presence of D2D communications to the eNB 200. When the number of UEs 100 existing in the own cell is large, the eNB 200 increases the amount of radio resources reserved as the Discovery resource. In contrast, when the number of UE 100 existing in the own cell is small, the eNB 200 reduces the amount of radio resources reserved as the Discovery resources.

Alternatively, in the second embodiment, the parameters related to UEs 100 in the own cell, a handover occurrence frequency of UE 100 from neighbor cells to the own cell, and/or a handover occurrence frequency of UE 100 from the own cell to the neighbor cell (hereinafter, simply referred to as "handover occurrence frequency"). When a handover occurs frequently, the eNB 200 increases the amount of radio resources reserved as the Discovery resources. In contrast, when handover occurrence frequency is low, the eNB 200 reduces the amount of radio resources reserved as the Discovery resources. Moreover, the eNB 200 changes the amount of radio resources reserved as Discovery resources, and transmits setting information for changing the transmission interval of Discovery signals to UE 100 in the cell. For example, the eNB 200 increases the amount of radio resources reserved as the Discovery resource, and transmits the setting information for shortening the transmission interval of Discovery signals to UE 100 in the cell. In contrast, the eNB 200 reduces the amount of radio resources reserved as the Discovery resource, and transmits the setting information for increasing the transmission interval of Discovery signal to UE 100 in the cell.

In the second embodiment, the eNB 200 changes radio resource amount reserved as Discovery resources by changing the cycle of time resources reserved as Discovery resources. The cycle of time resources reserved as Discovery resources is set to an integer multiple of the shortest cycle that is shared by the own cell and neighbor cells. That is, the shortest cycle is a common value in each cell.

Figure 13:
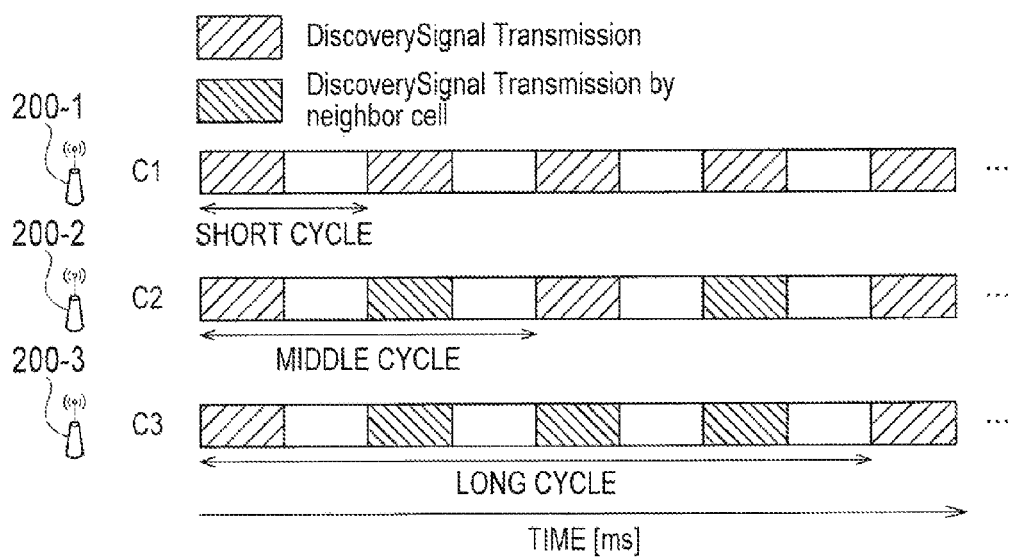
FIG. 13 is a diagram for explaining the cycle of time resources reserved as Discovery resources according to the second embodiment.

FIG. 13 is a diagram for explaining the cycle of time resources reserved as Discovery resources. In the second embodiment, the time resources that constitute the Discovery resources are reserved in units of subframe.

As illustrated in FIG. 13, the eNB 200-1 reserves subframes for transmitting and receiving discovery signals (hereinafter referred to as "Discovery subframes") in two subframes cycle, in the own cell C1. Here, two subframes cycle is assumed to be the shortest cycle. The eNB 200-2 reserves Discovery subframes in four subframes cycle (i.e., twice cycle of the shortest cycle), in the own cell C2. The eNB 200-3 reserves Discovery subframes in eight subframes cycle (i.e., three times cycle of the shortest cycle), in the own cell C3.

In the second embodiment, each of the eNBs 200-1 to 200-3 notifies eNBs 200 (neighbor eNBs) managing neighbor cells and UEs 100 in the own cell of changed Discovery subframes, when the Discovery subframes of the own cell are changed. This notification of Discovery subframes may be a notification of subframe number, or a notification of a value indicating how many times the shortest cycle (hereinafter referred to as "Cycle coefficient"). In the following, a case where the cycle coefficient is changed and notified will be mainly described.

Each of the eNBs 200-1 to 200-3, upon receiving the notification of the Discovery subframes from a neighbor eNB, uses the Discovery subframes reserved in the neighbor eNB to one of the following purposes. First, it is blanked (transmit nothing) so as not to interfere with the Discovery signals transmitted and received in the neighbor cell. Second, it is used as Discovery resources in the own cell so as to enable the discovery between UE 100 in the own cell and UE 100 in the neighbor cell. Third, it is used for interference measurements from UE 100 in the neighbor cell. Alternatively, the Discovery subframes reserved in the neighbor eNB may be utilized for cellular communications. In this case, processes such as reduction of the transmission power of the cellular communications, assigning the vicinity (or small path loss) UE of eNB, or performing a beamforming so as not to interfere with the neighbor cell are required.

Figure 14:
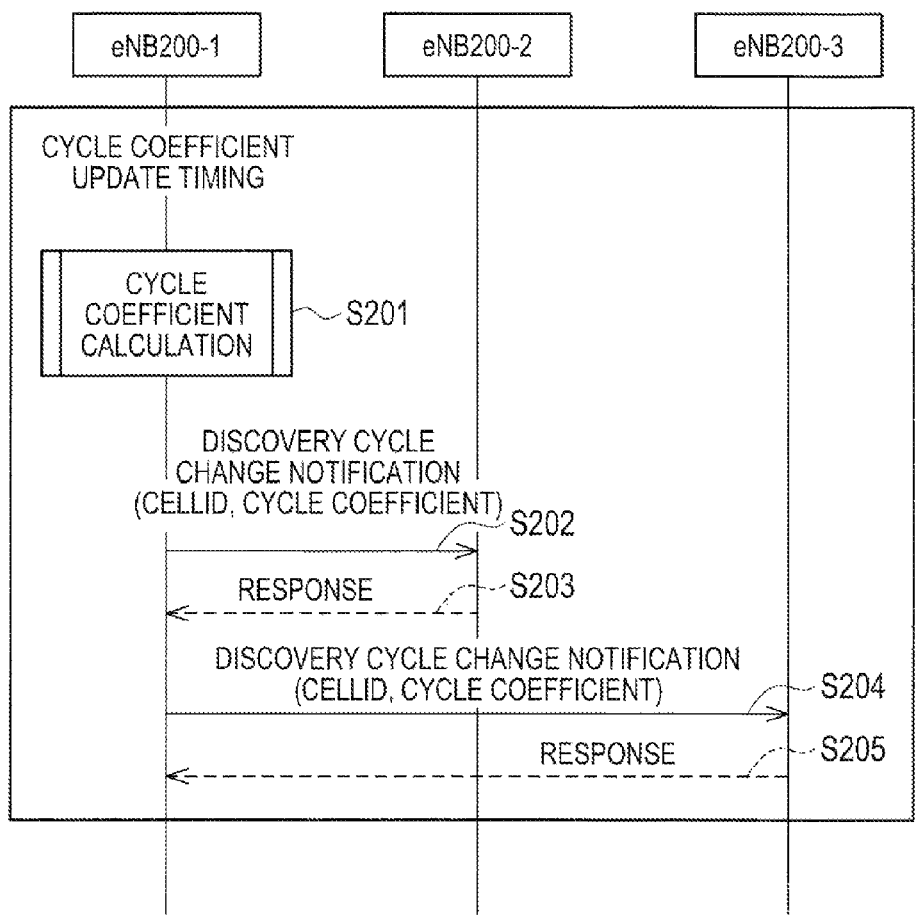
FIG. 14 is a sequence diagram for explaining a notification of a cycle coefficient to a neighbor eNB according to the second embodiment.

FIG. 14 is a sequence diagram for explaining a notification of cycle coefficient to a neighbor eNB. Here, the notification from the eNB 200-1 to the neighbor eNBs (the eNB 200-2 and 200-3) will be described.

As illustrated in FIG. 14, in step S201, the eNB 200-1 calculates the cycle coefficient. The calculation of cycle coefficients may be performed periodically, or may be performed by triggering base. In the case of the trigger base, for example, be the number of the cell or in the tracking area the UE as a trigger that the above or below a certain number, may be triggered by the handover occurrence frequency is above or below a certain number. I will be described later examples of the cycle coefficient calculation. If the cycle coefficient different from the previous cycle coefficients are calculated in step S201, the eNB 200-1 changes the cycle coefficient.

In steps S202 and S204, the eNB 200-1 transmits a Discovery cycle change notification indicating the changed cycle coefficient to the eNBs 200-2 and 200-3. The Discovery cycle change notification may include a cell ID for identifying a cell of the eNB 200-1. The eNBs 200-2 and 200-3 that have received the Discovery cycle change notification may transmit a response for the Discovery cycle change notification to the eNB 200-1 (steps S203 and S205).

Figure 15:
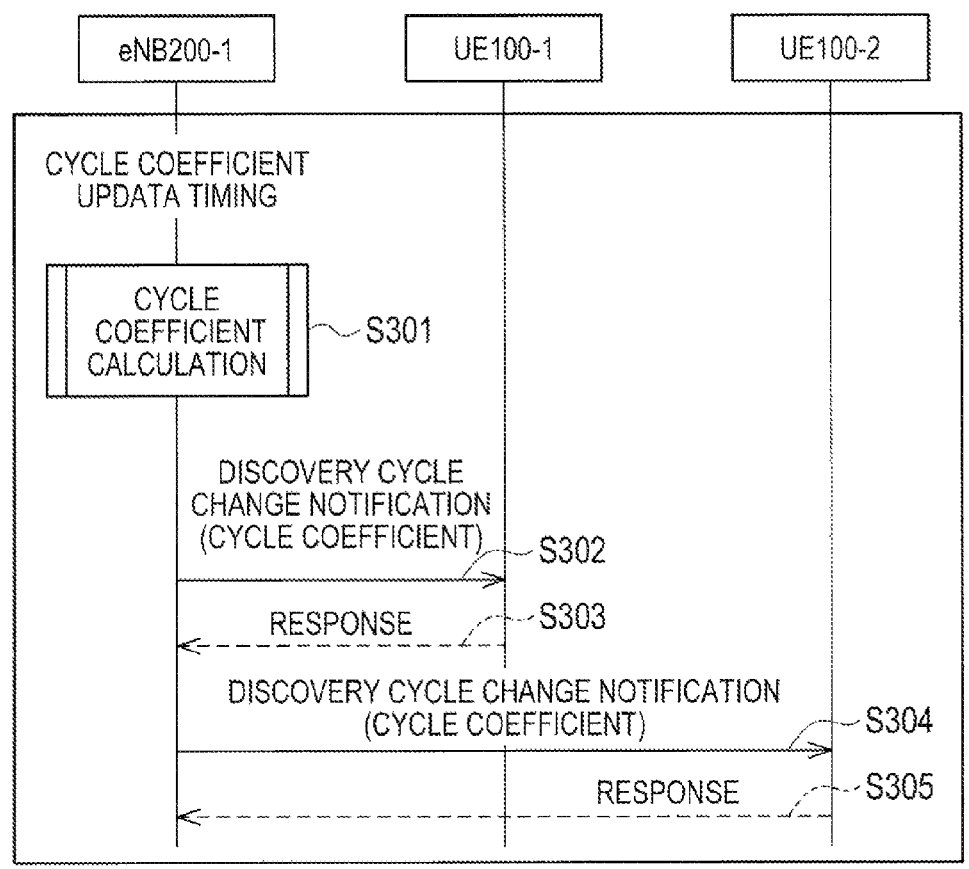
FIG. 15 is a sequence diagram for explaining the notification of the cycle coefficient to UEs in an own cell according to the second embodiment.

FIG. 15 is a sequence diagram for explaining the notification of cycle coefficient to the UE in own cell. Here, a notification from the eNB 200-1 to the UEs (UEs 100-1 and 100-2) in own cell will be described.

As illustrated in FIG. 15, in step S301, the eNB 200-1 calculates the cycle coefficient. The calculation of cycle coefficient may be performed periodically, or may be performed by triggering base. For example, in case of the trigger base, a trigger may be that the number of UEs in a cell or a tracking area exceeds or falls below a certain number. A trigger may be that the handover occurrence frequency exceeds or falls below a certain number. When the cycle coefficient calculated in step S301 is different from the previous cycle coefficient, the eNB 200-1 changes the cycle coefficient.

In steps S302 and S304, the eNB 200-1 transmits a Discovery cycle change notification indicating the changed cycle coefficient to UEs 100-1 and 100-2. The Discovery cycle change notification may be transmitted by a broadcast or a unicast. The UEs 100-1 and 100-2 that have received the Discovery cycle change notification may transmit a response for the Discovery cycle change notification to the eNB 200-1 (steps S303 and S305).

Figure 16:
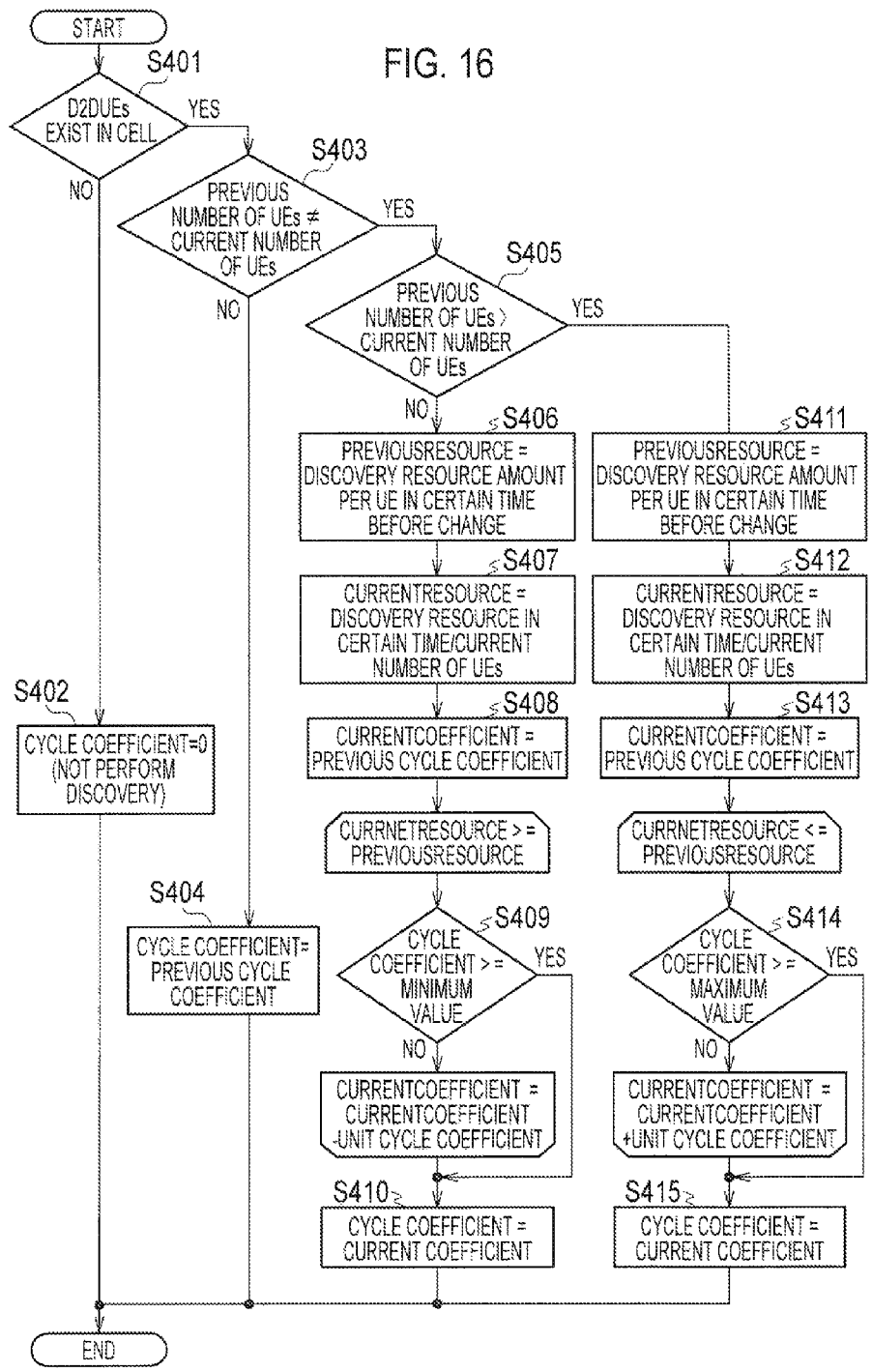
FIG. 16 is a flowchart for explaining a specific example 1 of the cycle coefficient calculation according to the second embodiment.

FIG. 16 is a flowchart for explaining a specific example 1 of the cycle coefficient calculation. Here, a case where the eNB 200-1 calculates the cycle coefficient will be described.

As illustrated in FIG. 16, in step S401, the eNB 200-1 determines an existence or non-existence of UEs in own cell. In this flow, the UEs in own cell may be UEs performing communications in the own cell or UEs transmitting Discovery signals in the own cell.

When the UEs in the own cell do not exist (step S401: No), in step S402, the eNB 200-1 sets the cycleic coefficients to zero. That is, subframes for Discovery are not reserved.

When the UEs in the own cell exist (step S401: Yes), in step S403, the eNB 200-1 determines whether the number of UEs in the own cell at the time of the current cycle coefficient calculation (hereinafter referred to as "current number of UEs") coincides with the number of UEs in the own cell at the time of the previous cycle coefficient calculation (hereinafter referred to as "previous number of UEs").

When the current number of UEs coincides with the previous number of UEs (step S403: No), in step S404, the eNB 200-1 sets the cycle coefficient to the value of the previous cycle calculation.

When the current number of UEs does not coincide with the previous number of UEs (Step S403: Yes), in step S405, the eNB 200-1 determines the magnitude relation between the current number of UEs and the previous number of UEs.

When the current number of UEs is greater than the previous number of UEs (step S405: No), in step S406, the eNB 200-1 calculates previousResource indicating the Discovery resources per one UE in the previous cycle calculation (="the amount of Discovery resources at the time of the previous cycle calculation"/"the previous number of UEs"). Moreover, in step S407, the eNB 200-1 calculates currentResource indicating the Discovery resources per one UE at the time of current cycle calculation (="the amount of Discovery resources at the time of the current cycle calculation"/"current number of UEs"). Then, in steps S408 to S410, the eNB 200-1 calculates and sets the current cycle coefficient within the range to the minimum cycle coefficient such that the currentResource exceeds the previousResource.

On the other hand, when the current number of UEs is less than the previous number of UEs (step S405: Yes), in step S411, the eNB 200-1 calculates previousResource indicating the Discovery resources per one UE in the previous cycle calculation (="the amount of Discovery resources at the time of the previous cycle calculation"/"the previous number of UEs"). Moreover, in step S412, the eNB 200-1 calculates currentResource indicating the Discovery resources per one UE at the time of current cycle calculation (="the amount of Discovery resources at the time of the current cycle calculation"/"current number of UEs"). Then, in steps S413 to S415, the eNB 200-1 calculates and sets the current cycle coefficient within the range to the maximum cycle coefficient such that the currentResource falls below the previousResource.

Figure 17:
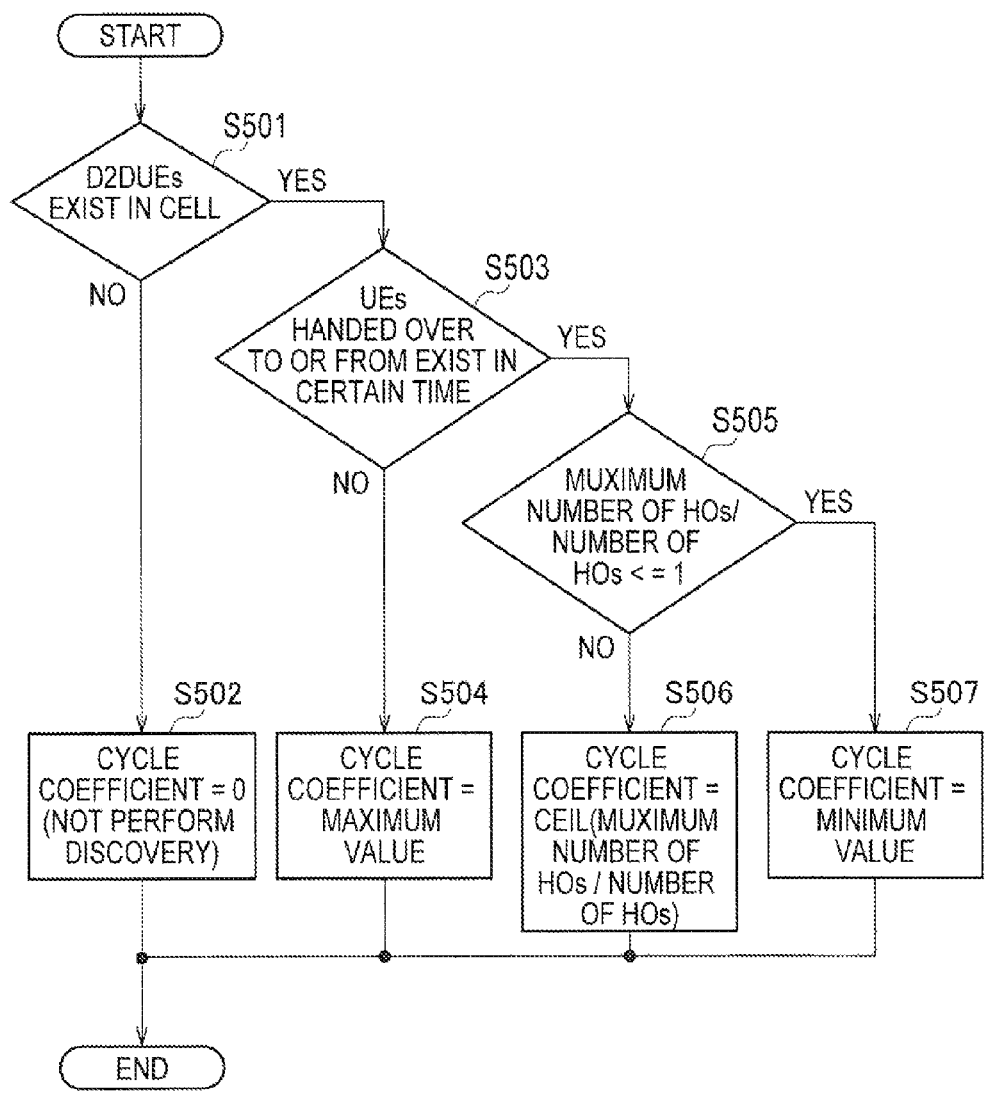
FIG. 17 is a flowchart for explaining a specific example 2 of the cycle coefficient calculation according to the second embodiment.

FIG. 17 is a flowchart for explaining a specific example 2 of the cycle coefficient calculation. Here, a case where the eNB 200-1 calculates the cycle coefficient will be described.

As illustrated in FIG. 17, in step S501, the eNB 200-1 determines an existence or non-existence of UEs in own cell. In this flow, the UEs in own cell may be UEs performing communications in the own cell or UEs transmitting Discovery signals in the own cell.

When the UEs in the own cell do not exist (step S501: No), in step S502, the eNB 200-1 sets the cycleic coefficients to zero. That is, subframes for Discovery are not reserved.

When the UEs in the own cell exist (step S501: Yes), in step S503, the eNB 200-1 determines an existence or non-existence of UEs that have performed handover to neighbor cells or UEs that have performed handover to the own cell during certain period until the current time.

When UEs that have performed handover to neighbor cells or UEs that have performed handover to the own cell during certain period until the current time do not exist (step S503: No), in step S504, the eNB 200-1 sets the cycle coefficient to the maximum value.

When UEs that have performed handover to neighbor cells or UEs that have performed handover to the own cell during certain period until the current time exist (step S503: Yes), in step S505, the eNB 200-1 determines a result of dividing maximum number of handovers by the number of UEs that have performed handover to neighbor cells or UEs that have performed handover to the own cell during certain period until the current time (hereinafter referred to as "number of handovers") is less than or equal to 1. The maximum number of handovers refers to the number of handovers corresponding to the minimum cycle.

When the result of dividing the maximum number of handovers by the number of handovers is greater than 1 (step S505: No), in step S506, the eNB 200-1 calculates and sets the result value (round off fractions) of dividing the maximum number of handovers by the number of handovers as the cycle coefficient.

When the result of dividing the maximum number of handovers by the number of handovers is less than or equal to 1 (step S505: Yes), in step S507, the eNB 200-1 sets the cycle coefficient to the minimum value.

(Conclusion of Second Embodiment)

The eNB 200 according to the second embodiment changes the amount of radio resources reserved as Discovery resources based on parameters related to UEs in the own cell. Thus, it is possible to adaptively change the amount of radio resources reserved as the Discovery resources.

The parameters related to UEs in the own cell are the number of UEs 100 existing in the own cell. Thus, an optimal amount of Discovery resources can be reserved for the number of UEs 100 existing in the own cell.

Alternatively, the parameters related to UEs in the own cell are a handover occurrence frequency. Thus, it is possible to reserve an optimal amount of Discovery resources for the number of UEs entering and leaving the own cell, i.e. moving status of UEs in the own cell. Moreover, the eNB 200 changes the amount of radio resources reserved as Discovery resources, and transmits the setting information for changing the transmission interval of Discovery signals to UE 100 in the own cell. Thus, it is possible to transmit and receive Discovery signals at the optimal cycle for the moving status of UEs in the own cell.

The eNB 200 changes the amount of radio resources reserved as Discovery resources by changing the cycle of time resources reserved as Discovery resources. The cycle of time resources reserved as Discovery resources (i.e. Discovery subframes) is set to an integer multiple of the shortest cycle that is shared by the own cell and neighbor cells. Thus, it is possible to synchronize the Discovery subframes between neighboring cells.

[Modification of Second Embodiment]

In the second embodiment, the amount of radio resources reserved as Discovery resources is changed per cell. However, it may be changed per tracking area, without limiting to a case of changing per cell. In the case of changing per cell, a change considering the status of idle state UEs 100 becomes easy.

In the second embodiment, the amount of radio resources reserved as Discovery resources is determined by the eNB 200. However, an upper device (such as OAM 400 or MME 300) for the eNB 200 may determine it and notifies the eNB 200 of the result thereof, without limiting to a case of determining by the eNB 200. Then, the eNB 200 may changes the amount of radio resources reserved as Discovery resources.

In the second embodiment, the time resources that constitute the Discovery resources are allocated per subframe. However, it may be allocated per radio frame or per symbol, without limiting to a case of allocating per subframe.

INDUSTRIAL APPLICABILITY

As described above, the present disclosure is useful for mobile communication fields since it is possible to appropriately control the D2D communications.

The invention claimed is:

1. A radio base station in a mobile communication system including a plurality of cells corresponding to a plurality of frequency bands, the radio base station comprising:
a transmitter configured to transmit a system information block indicating radio resources, to a user terminal, wherein the radio resources are used by the user terminal to transmit and/or receive a direct discovery signal for discovering another user terminal in proximity of the user terminal,
the system information block comprises:
information indicating a cycle of time resources reserved as the radio resources,
information indicating one or more frequency bands selected from the plurality of frequency bands, and
information indicating one or more resource blocks reserved as the radio resources in the one or more frequency bands, and
the transmitter is further configured to transmit, to the user terminal, a change notification information separately from the system information block, wherein the change notification information relates to a change of the radio resources.

2. A user terminal in a mobile communication system including a plurality of cells corresponding to a plurality of frequency bands, the user terminal comprising:
a receiver configured to receive a system information block indicating radio resources, from a radio base station, wherein the radio resources are used by the user terminal to transmit and/or receive a direct discovery signal for discovering another user terminal in proximity of the user terminal,
the system information block comprises:
information indicating a cycle of time resources reserved as the radio resources,
information indicating one or more frequency bands selected from the plurality of frequency bands, and
information indicating one or more resource blocks reserved as the radio resources in the one or more frequency bands, and
the receiver is further configured to receive, from the radio base station, a change notification information separately from the system information block, wherein the change notification information relates to a change of the radio resources.

3. An apparatus for a user terminal in a mobile communication system including a plurality of cells corresponding to a plurality of frequency bands, the apparatus comprising:
one or more processors configured to cause the user terminal to receive a system information block indicating radio resources, from a radio base station, wherein the radio resources are used by the user terminal to transmit and/or receive a direct discovery signal for discovering another user terminal in proximity of the user terminal,
the system information block comprises:
information indicating a cycle of time resources reserved as the radio resources,
information indicating one or more frequency bands selected from the plurality of frequency bands, and
information indicating one or more resource blocks reserved as the radio resources in the one or more frequency bands, and
the one or more processors are further configured to cause the user terminal to receive, from the radio base station, a change notification information separately from the system information block, wherein the change notification information relates to a change of the radio resources.

* * * * *